W. BARBER.
MOTOR VEHICLE.
APPLICATION FILED AUG. 26, 1915.
1,370,580.
Patented Mar. 8, 1921.
3 SHEETS—SHEET 3.
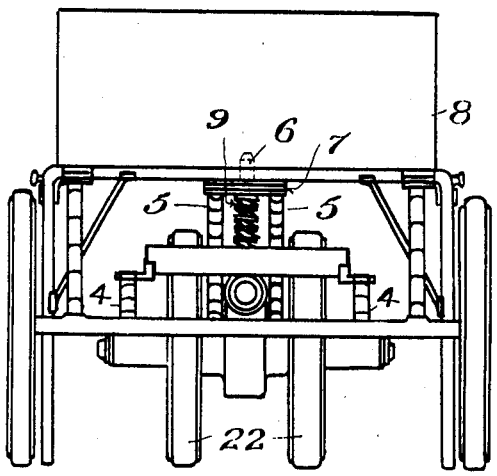
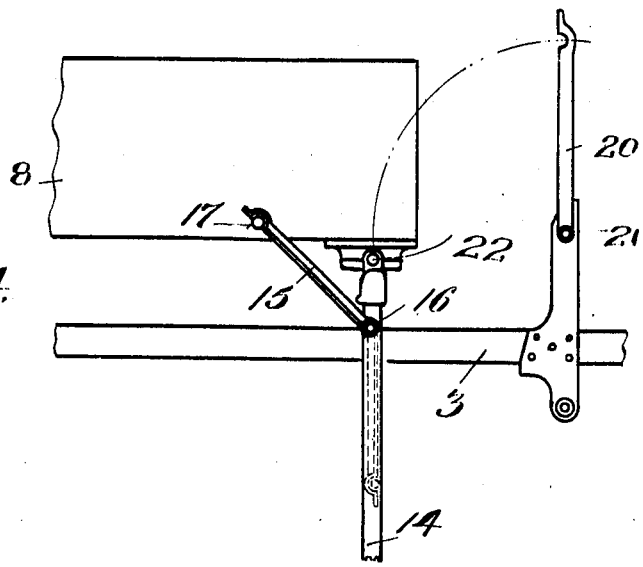

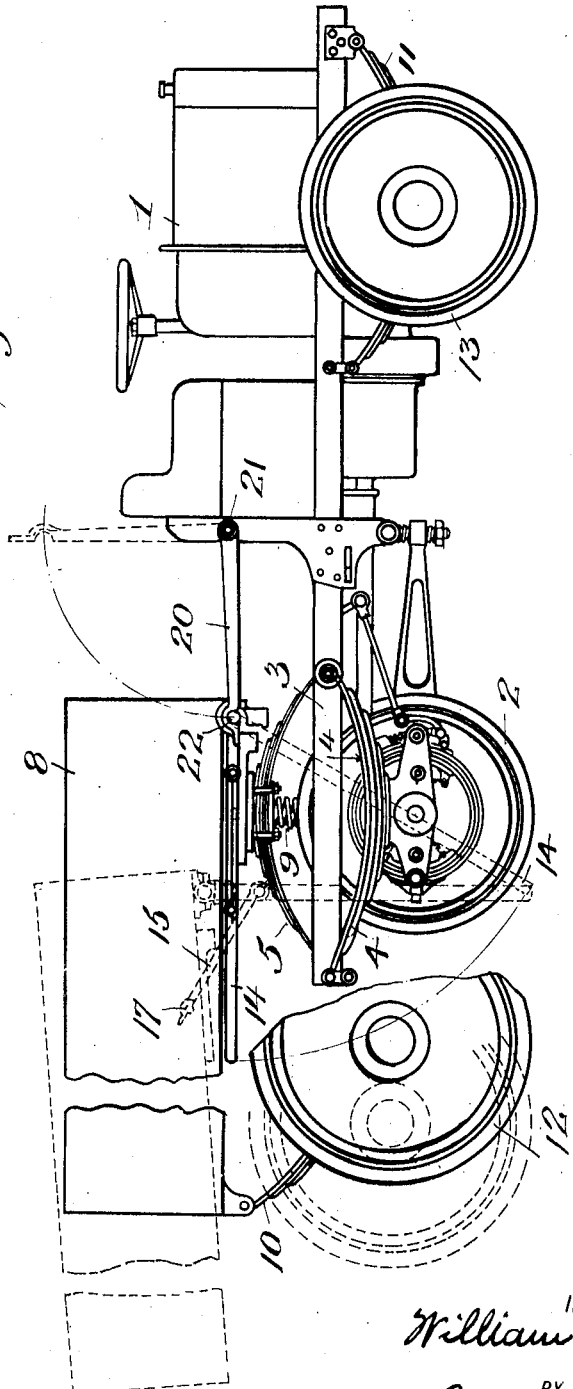

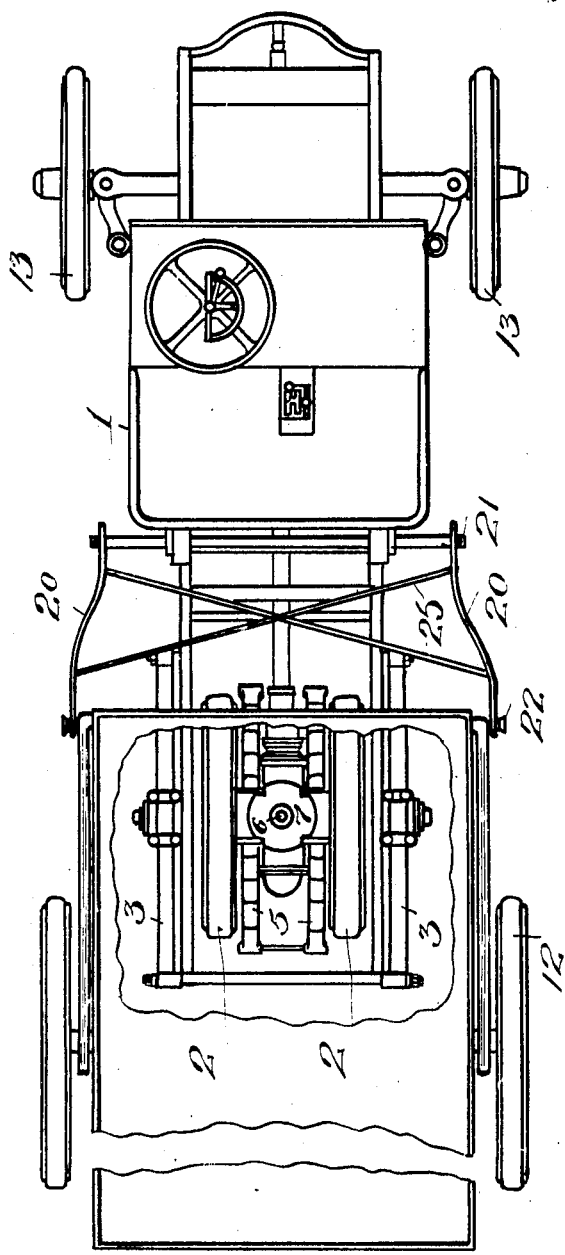

UNITED STATES PATENT OFFICE.

WILLIAM BARBER, OF NEW YORK, N. Y., ASSIGNOR TO ADA S. BARBER, OF BROOKLYN, NEW YORK.

MOTOR-VEHICLE.

1,370,580.  Specification of Letters Patent.  Patented Mar. 8, 1921.

Application filed August 26, 1915. Serial No. 47,551.

*To all whom it may concern:*

Be it known that I, WILLIAM BARBER, a citizen of the United States, residing at New York, county of Kings, State of New York, have made a certain new and useful Invention in Motor-Vehicles, of which the following is a specification.

This invention relates to motor vehicles and particularly to that class of the same used for trucking purposes and for carrying large loads, known as the tractor and trailer type of motor truck.

The object of the invention is to provide a motor tractor and trailer which is strong and durable, efficient in operation and economical of manufacture.

A further object of the invention is to provide a spring arrangement whereby the "dead load" of the trailer falls on the rear axle of the tractor.

A further object of the invention is to provide means for attaching the trailer to the tractor whereby they become a unit and travel as one vehicle.

A further object of the invention is to provide a leg or support for the trailer for automatically detaching the trailer from the tractor, and means for locking the leg or support in its extended position after the detachment of the trailer from the tractor is completed.

Other objects of the invention will appear more fully hereinafter.

The invention consists substantially in the construction, combination, location and relative arrangement of parts, all as will be more fully hereinafter set forth, as shown by the accompanying drawings and finally pointed out in the appended claims.

Referring to the drawings,—

Figure 1 is a view in side elevation, partly broken, showing a trucking vehicle embodying my invention.

Fig. 2 is a top plan view of the same.

Fig. 3 is a rear end view of the same.

Fig. 4 is a broken detail view, parts omitted, showing means for locking the support for the trailer in its extended position.

The same part is designated by the same reference numeral wherever it occurs throughout the several views.

In the well known type of motor trucks, and particularly the tractor and trailer type it is the usual arrangement to locate the springs of the tractor in such a position as to serve as the springs for the front portion of the trailer as well. The disadvantage of such an arrangement is obvious. When large loads of great weight are being hauled, it is evident that the vibrations and shocks that the springs will receive due to the combined load and weight of the trailer and the weight of the tractor body, necessitates springs of great strength and of fine material, and, consequently, of high cost. Further, due to the great strain on the springs, each separate shock is to a great extent transmitted to both the tractor and trailer by either of them, making the travel uneven, rough and jarring, and imposing a great strain on the body or chassis of the tractor and trailer.

To obviate these and other disadvantages, my present invention is especially directed.

Referring to Fig. 1 of the drawing, 1 designates generally the tractor which may be of any well known type or construction. In the drawing, however, I show that type of tractor which is provided with rear wheels or driving wheels 2, 2, located inside of the rear frame 3 of the tractor. The springs for the tractor body are shown at 4, and may be of any desired shape or type and attached to the body or chassis and casing of the axle of the rear wheels 2, 2, in any suitable, desired or well known manner. I propose to employ, in accordance with my invention, auxiliary springs 5, 5, also attached to the casing of the axle of wheels, 2, 2, for supporting the king pin 6 and the bearing plate 7 upon which the front end of the trailer rests. If desired and as shown, an additional spring, preferably of the coiled type, as shown at 9, may be employed to normally maintain the king pin 6 and the bearing plate 7 in opposition to any load or tension to which springs 5 may be subjected.

From the foregoing it will be seen that I provide a tractor and trailer spring arrangement wherein the dead weight of the load of the trailer is carried by the axle of the rear wheels of the tractor and is supported thereon by springs independent of the chassis or body springs of the tractor, thereby securing easy and comparatively smooth traveling of the trailer with respect to the tractor so that any shock received by either of them, such as going over an obstacle in the road, will not be transmitted to the other of them. Springs 10 may also be provided for the wheels 12 of the trailer and springs 11 for the front wheels 13 of the tractor as shown.

At the front end of the trailer I propose to pivotally connect a leg or support 14, held normally in a position parallel to the body thereof. This leg is of such length that when dropped to the ground about its pivot point, it extends rearwardly and downwardly from the front end of the trailer. When the tractor is moved backward, pushing the trailer in the same direction, the legs or supports 14 assume a vertical position with respect to the ground as indicated by dotted lines, Fig. 1 and in full lines Fig. 4, thereby automatically disconnecting the trailer 8 from its connection with the tractor 1 at the king pin connection. To prevent the trailer leg from being accidentally pushed from its supporting position with respect to the trailer body, I provide arms 15 pivotally connected to said legs or supports 14 at 16 and provided with a notch at their free ends to engage a pin or other suitable device 17, as shown in full lines Fig. 4. It will be understood however, that while I have shown and described one specific arrangement for locking the support in its operative position, many other arrangements will occur to those skilled in the art without departing from the broad scope of my invention as defined in the claims.

It may also be desired to provide an auxiliary and quick detachable connection between the tractor and trailer, and one which will serve to prevent the trailer from swinging on its king pin connection, i. e., one which will make the trailer rigid with the tractor, and the two of them, when traveling, will travel as one rigid vehicle. When such an arrangement is desired, I provide arms 20 pivotally connected to the body of the tractor 1 as at 21, and provided with a notch at their free ends which engage the pins 22 upon which the legs or supports 14 are pivotally connected as herein before described. If desired, and as shown in Fig. 2, reinforcing rods 25 may be connected between the arms 20 on each side of the vehicle.

It will be understood that when the trailer is to be detached from the tractor, and raised to its detached position by the tractor upon the supporting legs, the arms 20 may be raised either before or after the trailer has been detached from its king pin connection.

While I have shown and described specific structures embodying my invention it will be understood that various other arrangements and devices will readily suggest themselves to those skilled in the art without departing from the broad scope of my invention.

In my copending application Serial No. 7133, filed February 9, 1915, I have shown and described a tractor and trailer with one form of auxiliary attachment, but the subject matter thereof has been reserved for this, my present application.

It will be noticed that the auxiliary attachment arms 20, 20 serve several important functions. When the trailer is to be automatically detached from the tractor, the arms of the auxiliary attachment means insure a straight line of backward travel of the trailer when the same is forced backward upon the supports or legs 14 by the tractor, and prevents the trailer from swinging around its connection with the king pin. In addition thereto, the arms 20 to a great extent, receive the pressure of the tractor upon the trailer in backing, thereby relieving the pressure and the resulting friction between the king pin and its receiving slot in the trailer, thereby facilitating the automatic detachment of the trailer from the tractor. Further, in attaching the trailer to the tractor, assuming that the trailer is in its detached position, that is, with the supporting legs extended in vertical position, it will be seen that by first attaching the arms 20 to their pins 22, the pull of the tractor will be transmitted to the trailer by the arms 20 only, thereby insuring, through their straight line of pull, the proper seating of the trailer upon its king pin and bearing plate. It will readily be understood that all of these advantages may be secured by many other forms of auxiliary attachments without departing from the scope of my invention as defined in the claims.

What I claim is,—

1. The combination with a tractor and trailer, of springs attached to the axle of the rear wheels of said tractor to support the body thereof, auxiliary springs also attached to said axle for supporting the bearing plate upon which the trailer rests, a separate spring for normally maintaining said bearing plate in contact with said trailer.

2. The combination with a tractor and trailer, of a support for said trailer positioned at the front end thereof and pivotally connected thereto, said support being of such length that when the trailer is moved back thereon said support assumes a vertical position and automatically detaches said trailer from said tractor, and means for locking said support in its vertical position.

3. The combination with a tractor and a trailer, of means for connecting said trailer to said tractor, and auxiliary connecting means between said tractor and trailer, operated by the forward travel of said tractor for operating said first mentioned connecting means.

4. The combination with a tractor and trailer, of means for detachably connecting said trailer to said tractor, and means actuated by the movement of said tractor relative to the trailer for relieving the friction between said trailer and said tractor at the point of connection when said detachment is made.

5. The combination with a tractor and trailer, of means carried by said tractor and adapted to engage said trailer for automatically connecting said trailer to said tractor when said tractor is moved forward.

6. The combination with a tractor and trailer, means for automatically detaching said trailer from its bearing connection with said tractor when said tractor is moved backward, and means for maintaining a straight backward travel of the trailer when being detached from said tractor.

7. The combination with a tractor unit and a trailer unit, said tractor unit including a chassis frame having front and rear wheels, said rear wheels located beneath the rear end of said frame, and an axle for said rear wheels, of springs connected at their ends to the tractor chassis and supported intermediate their ends upon said axle, said trailer unit including rear wheels, and independent springs and additional auxiliary springs disposed above the tractor supporting springs and also supported upon said axle, the front end of the trailer being detachably supported by said independent springs.

8. In a motor vehicle, a tractor unit including a chassis, driving wheels therefor, said driving wheels located beneath the rear end of said chassis, an axle for said wheels, a housing for said axle and springs supported intermediate their ends upon said housing, and connected at their ends to said chassis, independent springs also carried by said housing, and a trailer unit having rear wheels, the front end of said trailer unit being carried by said independent springs and auxiliary springs also carried by said axle.

9. The combination of a tractor and trailer, of a driving axle for the tractor, said axle located beneath the rear end of said tractor, and carrying wheels, springs supported intermediate their ends upon said axle, the rear end of the tractor resting upon said springs, and independent springs also carried by said axle, the front end of the trailer resting upon said independent springs and additional springs also carried by said axle and interposed between the same and the front end of said trailer.

In testimony whereof I have hereunto set my hand on this 25th day of August, A. D. 1915.

WILLIAM BARBER.